United States Patent [19]
Ellis et al.

[11] 4,341,739
[45] * Jul. 27, 1982

[54] PHOSPHORIC ACID AMMONIATION APPARATUS

[75] Inventors: John D. Ellis, Upland, Calif.; George Crichton, Guadalajara, Mexico; Millard C. Godwin; George C. Morris, both of Lakeland, Fla.

[73] Assignee: Leathers Chemical Company, Limited, Yorkshire, England

[*] Notice: The portion of the term of this patent subsequent to Jan. 22, 1997, has been disclaimed.

[21] Appl. No.: 60,044

[22] Filed: Jul. 24, 1979

Related U.S. Application Data

[63] Continuation of Ser. No. 145,493, May 20, 1971, Pat. No. 4,185,075, which is a continuation-in-part of Ser. No. 684,348, Nov. 20, 1967, abandoned, and Ser. No. 785,321, Dec. 19, 1968, abandoned, and a continuation of Ser. No. 853,683, Aug. 28, 1969, abandoned.

[51] Int. Cl.³ .................. B01J 8/04; C01B 15/16; C05B 11/00
[52] U.S. Cl. .................... 422/207; 55/233; 71/36; 71/43; 261/95; 261/98; 261/112; 261/113; 422/62; 422/111; 422/224; 423/313
[58] Field of Search .................. 71/34, 43, 35, 36; 423/309-313; 422/225, 189, 62, 111, 191, 194, 207, 224

[56] References Cited

U.S. PATENT DOCUMENTS

| | | | |
|---|---|---|---|
| 2,902,342 | 9/1959 | Kerley, Jr. ......................... | 71/43 |
| 3,008,801 | 11/1961 | Adams ............................. | 423/313 |
| 3,130,033 | 4/1964 | Stephens ......................... | 71/1 |
| 3,310,371 | 3/1967 | Lutz ................................ | 423/310 |
| 3,459,499 | 8/1969 | Mullen, Jr. ...................... | 422/189 |
| 3,466,151 | 9/1969 | Sicardelat ....................... | 422/191 |
| 4,185,075 | 1/1980 | Ellis et al ........................ | 422/111 |

OTHER PUBLICATIONS

Hester et al.; Stengel Process Ammonium Nitrate.

Primary Examiner—Michael S. Marcus
Attorney, Agent, or Firm—Barry A. Bisson; William N. Patrick

[57] ABSTRACT

Aqueous ammonium phosphate solutions can be produced using an apparatus comprising: a fluid reactor having a plurality of inlets at one end thereof suitable for the admission of phosphoric acid, ammonia and water, the inlets being so positioned as to provide for rapid ammoniation of the phosphoric acid with the evolution of heat, to produce a reaction product mixture containing a liquid portion and steam, the fluid reactor having an exit for the expulsion of the reaction products mixture at the other end thereof, by steam generated by the heat liberated in the ammoniation process; a columnar vessel having an outlet at one end and, at the other end, enclosing the exit of the fluid reactor, a plurality of barriers obturating the columnar vessel in a spaced-apart relationship, and having a plurality of apertures therein for the passage of reaction products mixture therethrough; an inlet quench device connected to the columnar vessel for introduction therein of a liquid aqueous quenching fluid; and, a device in communication with the exit of the fluid reactor, for separating steam from the liquid portion of the reaction mixture and removing the separated steam from the apparatus.

14 Claims, 4 Drawing Figures

PHOSPHORIC ACID AMMONIATION APPARATUS

This is a continuation, of application Ser. No. 145,493, filed May 20, 1971 now U.S. 4,185,075 issued Jan. 22, 1980, which is a continuation of and in part discloses and claims subject matter disclosed in earlier filed pending applications, Ser. No. 684,348, filed Nov. 20, 1967 (now abandoned), Ser. No. 785,321, filed Dec. 19, 1968 (now abandoned), and is a continuation of Ser. No. 853,683, filed Aug. 28, 1969 (now abandoned).

This invention concerns the performance of fast and, usually, exothermic reactions between two or more reactants at least one of which is a liquid. The invention is more particularly applicable to reactions between acids, such as phosphoric acid, and bases such as ammonia and is especially applicable to the ammoniation of phosphoric acid and phosphoric acid containing polyphosphoric acid components.

Phosphoric acid and superphosphoric acid (the latter containing polyphosphoric acid components, that is, two or more orthophosphoric acid units condensed with the elimination of water molecules) have been ammoniated in the past by feeding ammonia to an aqueous solution of the acid, accompanied by stirring and cooling to 180° F. or lower temperatures in order to prevent hydrolysis of the polyphosphate components of the acid.

Phosphoric acid has also been ammoniated in a two stage process. In such a process, partial ammoniation is achieved in one reactor from which the intermediate product is pumped to a second stage reactor for completion of the ammoniation. Viscosity and the ability to pump the intermediate product is a function of pH and therefore the degree of ammoniation has to be carefully controlled in the first stage.

The above discussion indicates that there is a need for a process of ammoniating phosphoric acid in a single reactor and thereby eliminating the problems which are inherent in two stage ammoniation.

It is therefore an object of this invention to provide a novel process for accomplishing rapid reactions and, in particular, for accomplishing rapid ammoniation of phosphoric acid and other acids.

It is also an object of this invention to provide a process for the ammoniation of phosphoric acid which converts orthophosphoric acid to polyphosphoric acid and results in an ammoniated product containing polyphosphate values.

A further object is to provide apparatus for the performance of the process of the invention.

The invention will be explained in further detail with reference to the accompanying drawings, in which.

Like elements are identified by the same numerals in the different figures.

Figure 1:
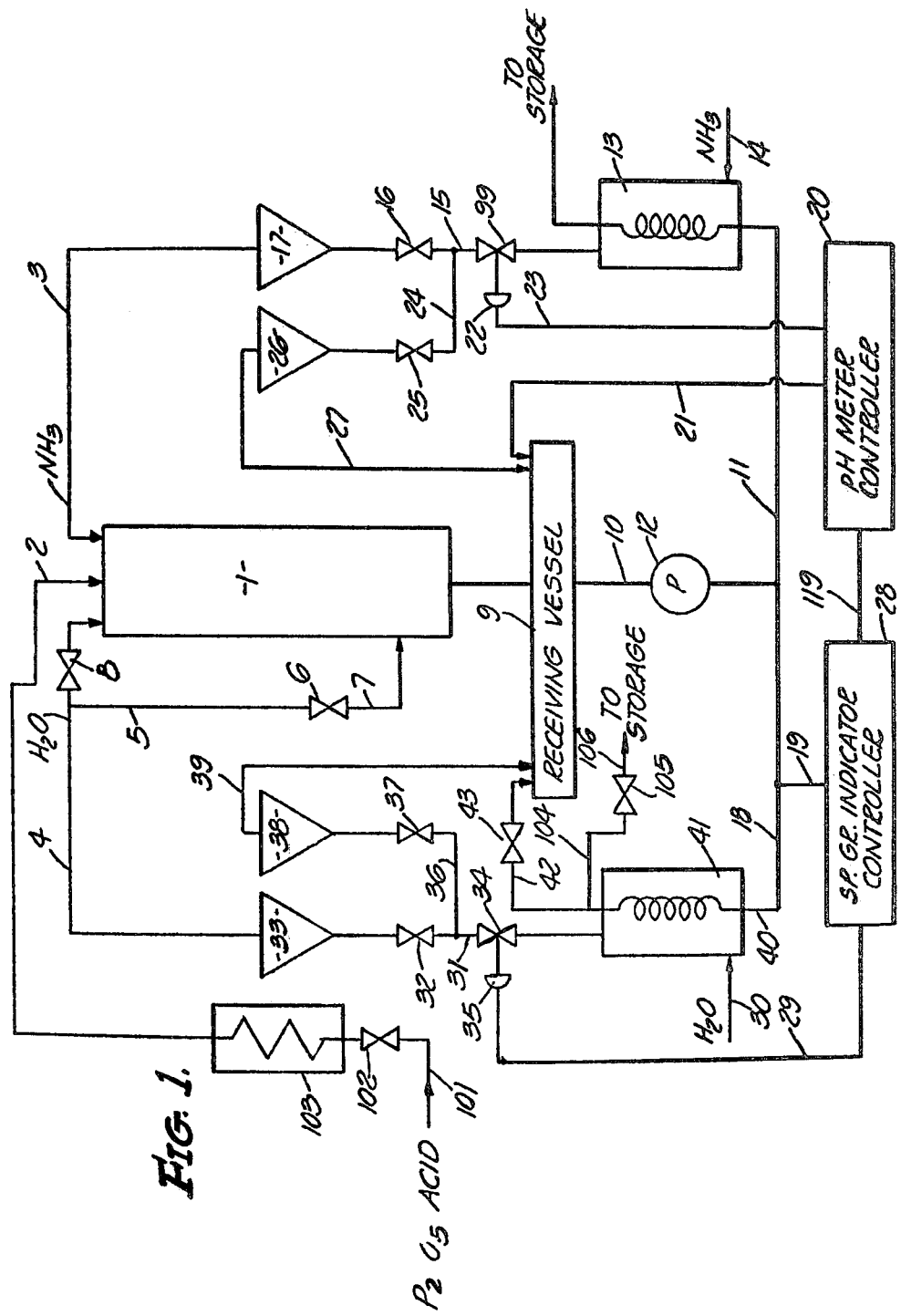
FIG. 1 is a schematic diagram.

The invention will be described in relation to its application to the ammoniation of phosphoric acid which can contain polyphosphoric acid components. In this application, the process comprises mixing phosphoric acid, ammonia and water in a reaction zone. The ammoniation of phosphoric acid and/or superphosphoric acid proceeds rapidly with the evolution of heat. The amount of heat evolved is sufficient to convert the water that is present to steam and also to drive off some water of constitution from two or more molecules of orthophosphoric acid, pyrophosphoric, tripolyphosphoric acid and other polyphosphoric acids, ammonium orthophosphate, ammonium pyrophosphate, ammonium tripolyphosphate and ammoniated species of other polyphosphoric acids. The resulting product, in the presence of ammonia, is the mixture of ammonium phosphate and ammonium polyphosphates. If insufficient ammonia is present, the mixture then also contains orthophosphoric acid and polyphosphoric acid components. The term "poly-" as used in this writing includes species formed from the condensation of two or more orthophosphoric acid and/or orthophosphate molecules and therefore includes pyrophosphoric acid and ammonium pyrophosphate as well as tri-, tetra-, penta- and higher polyphosphoric acids and ammonium polyphosphates. As a result of the elimination of water of constitution at the high temperatures of 300° F. to 700° F. that are achieved in the reaction zone, at least a portion of the phosphate material in the feed components is converted to polyphosphates. In other words, in addition to ammoniating orthophosphoric acid polyphosphoric acids, the present process provides a method for converting $P_2O_5$ in the orthophosphate form to the polyphosphate form.

The water that is introduced into the reaction vessel is either present in the phosphoric acid solution that is used or is added as required in accordance with the teachings herein.

The steam that is formed in the reaction vessel builds up a pressure that aids in propelling the reaction mixture through and expelling if from the reaction zone. At elevated temperatures of from 400° F. to 700° F., the product is expelled in the molten state. Alternatively, the product can be quenched with water prior to or after discharge from the reaction vessel to form an aqueous ammonium phosphate and ammonium polyphosphate fertilizer solution. A 10-34-0 (10% by weight nitrogen, 34% by weight $P_2O_5$ and 0% $K_2O$) grade fertilizer is readily made by this process.

Steam separates from the product mixture upon discharge from the reaction vessel. In one of the embodiments of this invention a cooling tower is provided in which separation of product from steam is effected. This is more fully set forth below in the description relating to FIG. 4.

The reaction mixture remains in the reaction zone for a residence or retention time of from about 0.1 second to about 15 minutes. Retention times of shorter durations within such range are preferred. Good results are obtained, for example, when the retention time is from about 1 second to about 8 minutes. Especially preferred are the short retention times of from about 1 second to about 3 minutes. This is especially true at relatively high reaction temperatures.

The reaction mixture is the reaction zone is maintained at a temperature within the range of from about 150° F. to about 700° F. At lower temperatures the reaction period (or retention time) can be for a much longer duration than at higher temperatures. This is the reason for the spread in the length of retention times which were discussed above. Although reaction temperatures in the range of 150° F. to 700° F. can be employed, it is preferable to employ temperatures of from about 225° F. to about 600° F. which provide for a readily controllable reaction rate. Especially preferred is a reaction temperature range of from about 450° F. to about 575° F. The product is discharged from the reaction vessel either as a melt at approximately the reaction vessel temperature or it is quenched with water and discharged at temperatures in the range of 100° F. to 250° F. Preferably the product is discharged at a temperature in the range of 150° F. to 225° F. and then promptly cooled to 150° F. and lower.

An alternate embodiment of this invention is to employ in the reaction mixture only a part of the ammonia required to form an end product having a predetermined pH of from about 3.5 to about 8.5 Additional ammonia can then be added to the cooler reaction product after it has been discharged from the reaction vessel in an amount sufficient to produce an end product having the desired composition and pH.

An alternate embodiment of this invention is to employ in the reaction mixture only a part of the water required to form an end product having a predetermined specific gravity. After the reaction product mixture has been discharged from the reaction vessel, water is added in an amount sufficient to obtain an end product of the desired composition and having a predetermined specific gravity.

The end product can be further cooled to about 60° F. to 120° F. by passing it in heat exchanging relationship with ammonia or by other conventional cooling means. Preferably, the ammonia employed for this purpose is the ammonia which is used in carrying out the process of this invention. In this case at least a portion of the liquid ammonia is gasified by this means.

In one embodiment of this invention there is included the step of monitoring the specific gravity of the end product and adjusting the amount of water employed in the method to provide an end product which has a predetermined specific gravity. The specific gravity is a function of the end product with regard to specific nitrogen and phosphorus analysis. For example, the specific gravity of the product 11-37-0 is in the range of 1.25-1.45. The specific gravity of 10-34-0 is in the range of 1.34-1.43. The specific gravity of 12-43-0 is in the range of 1.42-1.55. The specific gravity of 8-24-0 is about 1.28. Generally the specific gravity can vary from about 1.25 to about 1.55.

An embodiment that can be used in this invention is to conduct the ammoniation under a pressure of from about 0.1 to about 100 psi (pounds per square inch as measured by a gauge) in the reaction vessel. A preferred range of pressures when ammoniating phosphoric acid having a $P_2O_5$ content of from about 30% to about 68% is 10-60 psi. An especially preferred range for conversion of the phosphates to polyphosphates is 20 to 40 psi. When pressures are employed, suitable pumps are employed in the acid, water and ammonia feed lines to facilitate introduction of the reactants into the reaction vessel.

Another embodiment that can be used in this invention is to preheat the feed acid. This permits the achievement of a higher temperature in the reaction vessel in a shorter period of time which, in turn, permits the use of a shorter retention time. Preheating can be accomplished by any conventional means. A preheating of the feed acid having a 30%-68% $P_2O_5$ content to a temperature of from 70° F. to 575° F. results in a higher percentage conversion of the phosphates to polyphosphate components in the reactor. A preferred range of preheating temperature is 150° F. to 450° F. When the acid is preheated to its boiling point, a concentration to a higher $P_2O_5$ content is achieved. For example, a 30% $P_2O_5$ acid heated to 500° F. is concentrated to approximately 65% $P_2O_5$. Such concentration during preheating is sometimes referred to as preconcentration.

A further embodiment that can be employed is to preheat, by any conventional means, in addition to those shown in the drawings, the water and ammonia that is admitted to the reaction vessel. The water can be preheated to a temperature within the range of 70° F. to 99° F. Water that is heated to a temperature of from 85° F. to 95° F. gives good results and preheating to within this range constitutes a preferred embodiment of this invention. The anhydrous ammonia can be vaporized and introduced into the reaction vessel at temperatures ranging from just above the boiling point of ammonia to about 500° F., that is, a temperature within the range of −27° F. to 500° F. It is preferred, however, to preheat the ammonia to a temperature of from 50° F. to 200° F. Temperatures within this range are readily attainable by the process of heat exchanging either with the product which is discharged from the reaction vessel or by other conventional means. A heating coil in an external heater (not shown) is used when the ammonia is preheated to a temperature of 80° F. or higher.

In FIG. 1, either wet process or furnace phosphoric acid, anhydrous ammonia and water, one or all of which can be preheated as previously described, are admitted into reaction vessel 1 through conduits 2, 3 and 4, respectively. When the phosphoric acid is preheated, it is introduced through conduit 101, valve means 102, heat exchange means 103, and conduit Z to the reaction vessel 1. Heat can be supplied to the heat exchange means 103 in any conventional manner. Wet process acids contain small amounts of iron and aluminum impurities as well as impurities of other substances found in phosphate bearing ores. The phosphoric acid, water and ammonia are metered into the reaction vessel by conventional metering apparatus such as a metering pump or magnetic flow meter (not shown). Ammonia reacts with the acid to form ammonium phosphate and ammonium polyphosphate with the liberation of heat. The amount of water added to the reaction vessel together with the phosphoric acid and ammonia is sufficient to keep the temperature of the reaction mixture within the range of 150° F. to 700° F. Additional water is added as necessary to quench the reaction product.

The heat liberated upon ammoniation of the acid is sufficient to convert part of the water to steam as the reaction mixture progresses through the reaction vessel. By suitable adjustment of valve means 6 and 8, additional water can be admitted through conduit 5, valve means 6 and conduit 7 into the reaction vessel near the product exit port. The water quenches the reaction mixture so that it can be discharged from the reaction vessel to the receiving vessel 9 at a temperature of 100° F. to 250° F. Preferably, it is discharged at a temperature of 180° F. or lower, or quickly cooled in the receiving vessel by suitable means (not shown) to 180° F. or lower in order to minimize hydrolysis of the polyphosphates.

The reaction product mixture can be transferred through conduits 10 and 11 to storage either by gravity or with the aid of pump 12. Should it be desirable to lower the temperature of the reaction product or to preheat the ammonia, it may be passed in heat exchanging relationship with ammonia through the heat exchanging means 13 and then conducted to storage.

Ammonia is fed in through inlet 14, heat exchanger 13, conduit 15, valve 16, meter 17, and conduit 3 to the inlet to reaction vessel 1.

Water employed in the process is fed to the inlet of conduit 30 through conduit 31, valve 32, meter 33 and conduit 4 to the water inlet to reaction vessel 1. The water can be preheated in heat exchange means 41 by the product passing through conduits 18, 40, 104, valve means 105 and conduit 106 to storage. The heat exchange means 41 can, of course, be mounted in conduit means 11. Should it be so desired, a portion of the product can be recycled through conduit 42 and valve means 43 to the receiving vessel 9.

The ammonia and phosphoric acid can be admitted to the reaction vessel in the correct proportions to obtain a reaction product having the desired pH. Alternatively, a portion of the reaction product is routed through conduits 19, 119, pH meter-controller 20 and conduit 21, back to the receiving vessel 9. The pH meter-controller monitors the pH of the reaction product and provides an electrical outlet signal of a phase and magnitude proportional to the direction and degree of deviation of the measured pH from a predetermined pH set in the instrument. Equipment for measuring the pH and providing a pH meter-controller output signal is readily available commercially and will not be further described here. A valve 99 in ammonia conduit 15 is actuated by valve actuator 22 in response to the output signal from the pH meter-controller 20 received through electrical conductor 23. Valve actuator 22 controls the opening in valve 99 to increase or decrease the flow of ammonia therethrough so as to bring the pH of the reaction product back to the predetermined pH set on the pH meter-controller instrument. For example, when the pH is higher than the predetermined value, the opening in valve 99 is reduced thereby reducing the flow of ammonia therethrough, which will have the effect of producing a reaction product with a lower pH. On the other hand, if the pH is too low, valve actuator 22, in response to the signal from the pH meter-controller, turns valve 99 to increase the opening therethrough, allowing ammonia to flow through conduit 15 at a higher rate to thereby provide a product with a higher pH.

An alternate embodiment of this invention is to take from about 1% to about 30% of the ammonia employed in the process and feed it directly to the reaction product mixture in receiving vessel 9 through conduit 24, valve 25, meter 26 and conduit 27. Valves 16 and 25 can be adjusted, for example, to permit about 85% of the ammonia used in the process to flow through conduit 3 to the inlet to reaction vessel 1 and about 15% to flow through meter 26 and conduit 27 to the reaction product receiving vessel where the reaction product mixture is further ammoniated. The ammonia can be bubbled into the reaction product mixture through a sparger, not shown, located near the bottom of the vessel. The total amount of ammonia employed in the process is controlled by the pH meter-controller 20.

A specific gravity indicator-controller 28 can be mounted in conduit means 19–119 to monitor the specific gravity of the portion of reaction product that is being circulated through conduits 19, 119, pH meter-controller 20 and back to the receiving vessel 9 through conduit 21. The specific gravity indicator-controller monitors the specific gravity of the reaction product mixture and provides an electrical output signal through electrical conductor 29 of a phase and magnitude proportional to the direction and degree of deviation of the specific gravity from the predetermined specific gravity which has been set on the specific gravity indicator instrument. Equipment for measuring specific gravity and providing a specific gravity controller output signal is readily available commercially and will not be described here.

Valve 34 in conduit 31 is controlled by valve actuator 35 and controls the amount of water flowing through conduit 31. Valve controller 35 is responsive to the output signal from specific gravity indicator-controller 28 and increases or decreases the opening in valve 34 so as to permit that amount of water to flow therethrough which will provide an end product having predetermined specific gravity. For example, if the specific gravity is too low the valve controller 35 will decrease the opening in valve 34 to permit less water to flow therethrough, thereby increasing the density of the reaction product. On the other hand, if the specific gravity of the reaction product is too high, the valve controller 35, in response to the signal from the specific gravity indicator-controller 28, will operate valve 34 to increase the opening therethrough, allowing more water to flow through conduit 31, thereby providing a product having a lower specific gravity.

An alternate embodiment of this invention is to take from about 1% to about 30% of the water flowing through control valve 34 and route it through conduit 36, valve 37, meter 38 and conduit 39 to the receiving vessel 9. For example, the total amount of water employed in the process can be divided to provide for a flow of about 80% of such water through meter 33 to the reaction vessel 1 and 20% of the water through meter 38 and conduit 39 to the reaction product receiving vessel 9.

Figure 2:
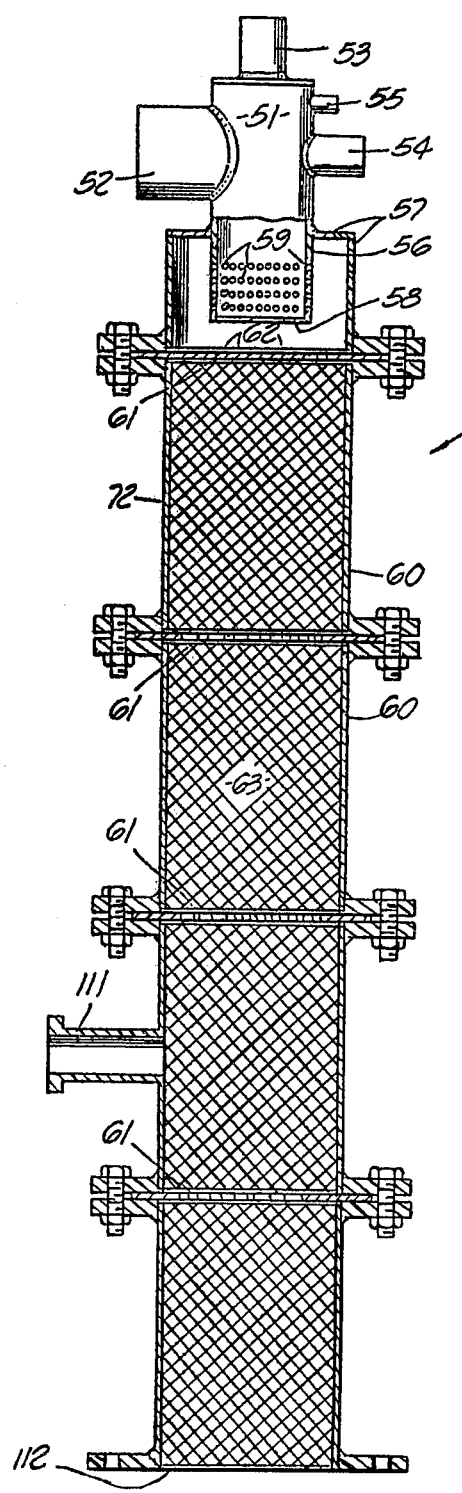
FIG. 2 is a view partially in section of the reaction vessel of FIG. 1.

The reaction vessel means 1, shown in FIG. 2, has a fluid receiving means 51 with one end thereof extending into the interior of column means 72. The fluid receiving means 51 is equipped with inlet means 52, 53 and 54 for acid, ammonia and water, respectively. The fluid receiving means can also be equipped with means for attaching pressure indicating devices and other instruments as at 55. The end 56 of the fluid receiving means 51, which is encompassed by the closed end 57 of the column 72, has a closed end 58 and a plurality of apertures 59 in the walls communicating between the interior of the fluid receiving means 51 and the interior of the column 72. The number and size of the apertures in the end 56 depend on the capacity of the apparatus, that is, the volume of reaction mixture components required to pass therethrough per unit time. The apertures can be circular, square or any other desired shape. It is found that circular apertures having a diameter of from about 1/16 inch to about $\frac{3}{4}$ inch, or higher, are satisfactory for the process of this invention. Circular apertures having a diameter of from about $\frac{1}{8}$ to about $\frac{3}{8}$ inch are preferred since they impart a good degree of mixing to the components as they pass therethrough. Especially preferred are circular apertures having a diameter of $\frac{1}{4}$ inch as these provide for good mixing of product. The apertures can be spaced from about $\frac{1}{4}$ inch apart, in the case of apertures having a diameter of $\frac{1}{8}$ inch, to about $2\frac{1}{2}$ inches apart in the case of apertures having a diameter of $\frac{3}{4}$ inch. Apertures having a diameter of $\frac{1}{4}$ inch can be spaced from about $\frac{3}{8}$ to about $\frac{3}{4}$ inch apart. Apertures having a diameter of $\frac{1}{4}$ inch disposed about $\frac{1}{2}$ inch apart in the walls of the end 56 of the fluid receiving means 51 are found to perform satisfactorily for the process of this invention.

The apertures 59 in end 56 of the fluid receiving means 51, in diameter and number should be such as to provide a pressure drop for fluid passing therethrough in the range of about 0.1 to about 100 psi. It is preferred that the pressure drop be within the range 10 to about 60 psi for thorough mixing of the components of the reaction mixture passing therethrough. In order to maintain a predetermined pressure within the reaction vessel, the outlet 112 of the reaction vessel can be closed off and equipped with a valve means, not shown.

The column 72 is composed of a plurality of cylindrical sections 60. A flange or other means at each end of a section permits the sections to be stacked and fastened together by means of bolts or other retaining means as shown in the drawing. The section 57 which encompasses end 56 of the fluid receiving means 51 also has a flange or other means at the open end thereof adapted for mounting said fluid receiving means 51 on to one end of the column 72. A plurality of plate members 61 having a plurality of apertures in each, obturate the column in spaced apart relationship. A plate member 61 is mounted in between two sections of the column at a plurality of junctions of such plurality of sections 60. The apertures 62 in plates 61 can have the same characteristic as the apertures in the walls 56 of the fluid receiving means 51. When the apertures are circular, the diameter thereof can vary from about 1/16 inch to about 1 inch. Apertures having a diameter of from about ¼ to about ¾ inch are found to serve satisfactorily in providing a means for mixing the components making up the reaction mixture in this invention. A water inlet means 111 is provided near the bottom of the column 72 through which water is introduced for quenching or cooling, or for adjustment of the product composition of the reaction product mixture.

Suitable packing 63 is disposed in the column 72 between the plate members 61. The requirement of the packing is that it provides for a mixing of the components passing therethrough in order to enhance the efficiency of ammoniation of the acid. Suitable packing material for example is ⅛ to 2 inch stainless steel pipe cut into sections of ¼ inch to about 2 inches. Pall or Raschig packing, berl saddles, grid packing and spiral grids are examples of other packing material that can be employed. The material of construction of the equipment used in the process of this invention can be any corrosion resistant material such as, for example, stainless steel.

Figure 3:
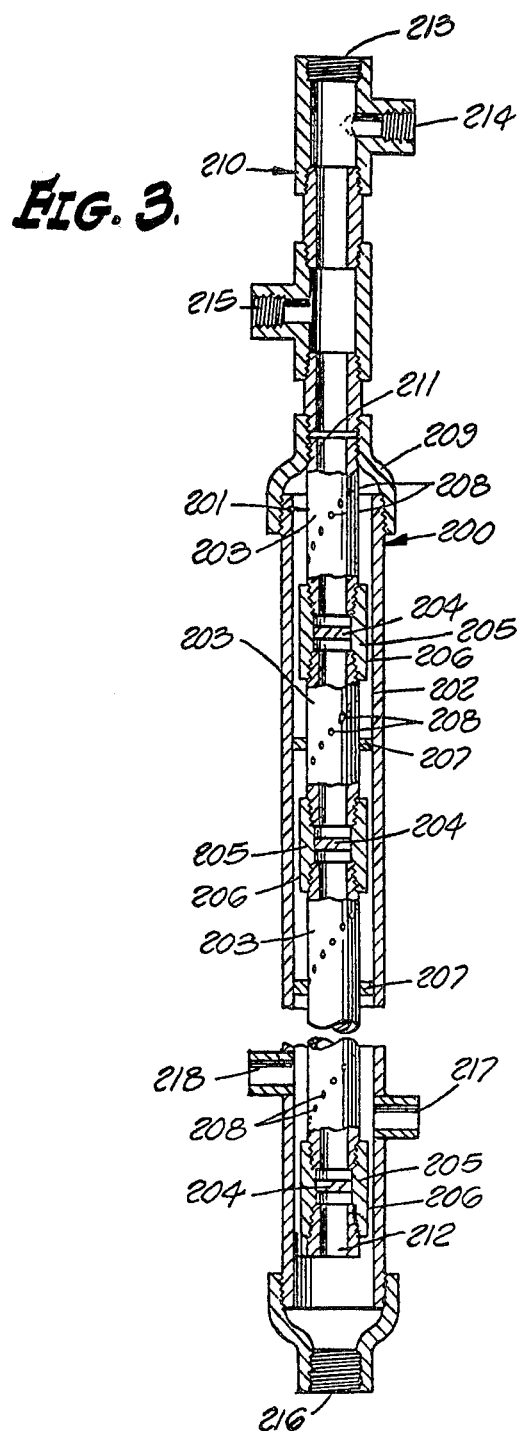
FIG. 3 is a view, parially in section, of an alternate embodiment of the reaction vessel.

FIG. 3 shows an alternate embodiment of a reaction vessel, comprising fluid reactor means and columnar vessel means, that can be used in carrying out the process of this invention. The reaction vessel 200 has an inner hollow element 201 which can be elongated or tubular in design, and an outer jacket means 202 providing an annular passageway 206 therebetween. The element 201 has an inlet end 211 (which is also the inlet to vessel 200) and a terminal end 212 made up of a plurality of hollow sections 203 connected end-to-end. The walls of each of the sections are perforated with a plurality of holes 208 to permit fluid to pass in and out of the coaxial passageway within the elements 203. A plurality of partition means or plate members 204 obturate the passageway in spaced apart relationship. A partition means is positioned between two successive sections 203 at a plurality of junctions of such sections and is held in place by a coupling member 205 which is used to fixedly join together two ends of two sections 203. The annular passageway 206 is obturated by a plurality of annular baffle members 207 between the inner wall of jacket means 202 and the outer walls of the element 201. An individual such annular baffle member 207 is located intermediate each pair of successive plate members 204. A tortuous path is thus provided whereby the reaction mixture is required to pass through the holes 208 from the inside of one member 203 into the annular passageway 206 and back into the inner passageway of an adjoining section 203. Good mixing of the compounds of the reaction mixture is thus accomplished.

The end of the outer jacket means 202 near the inlet end 211 of the vessel 200 contacts the element 201, as by a reducing member 209 or other means, to form an upper closure to the annular passageway 206. Inlet element 210 is connected to the inlet end 211 of the inner element 201 and has inlet means 213, 214 and 215 through which are introduced phosphoric acid, ammonia and water into the reaction vessel. The outer jacket member 202 terminates in an outlet end 216. The terminal end 212 of the element 201 can be disposed within the outer jacket means 202, near the outlet end 216 thereof. Alternatively, the terminal end 212 can be extended with a portion of a perforated section 203 and connected to the outlet end 216. If desired, in order to maintain a predetermined pressure within the reaction vessel, the outlet 216 of the reaction vessel 200 can be equipped with a valve means, not shown. The reaction vessel 200 can also be equipped with means for attaching temperature or pressure indicating devices or other instruments as at 218. Inlet means 217 are provided in the outer jacket means 202 adjacent the ends 212 and 216. Water and/or other materials can be introduced through such inlet means. In the manufacture of ammonium phosphate and/or polyphosphate fertilizers, water is added either through inlet element 210 or 217, or both, to provide a fertilizer composition.

The number and size of the holes 208 in the element 201 depend on the desired capacity of the apparatus, that is, the volume of reaction mixture components required to pass therethrough per unit time. The holes can be circular, square or any other desired shape. It is found that circular holes having a diameter of from about 1/16 inch to about ¾ inch, or higher, are satisfactory for the process of this invention. Circular holes having a diameter of from about ⅛ inch to about ⅜ inch are preferred in element 201 since a good degree of mixing of the components is achieved with such an element. Especially preferred is an element 201 having circular holes with a diameter of ¼ inch, as good mixing of product is then accomplished. The holes can be spaced from about ¼ inch apart in the case of holes having a diameter of ⅛ inch, to 1½ inches apart in the case of holes having a diameter of ¾ inch. Holes having a diameter of ¼ inch can be spaced from about ⅜ to about ¾ inch apart. Element 201 with holes having a diameter of ¼ inch disposed about ½ inch apart in the walls thereof are found to perform satisfactorily for the process of this invention.

Figure 4:
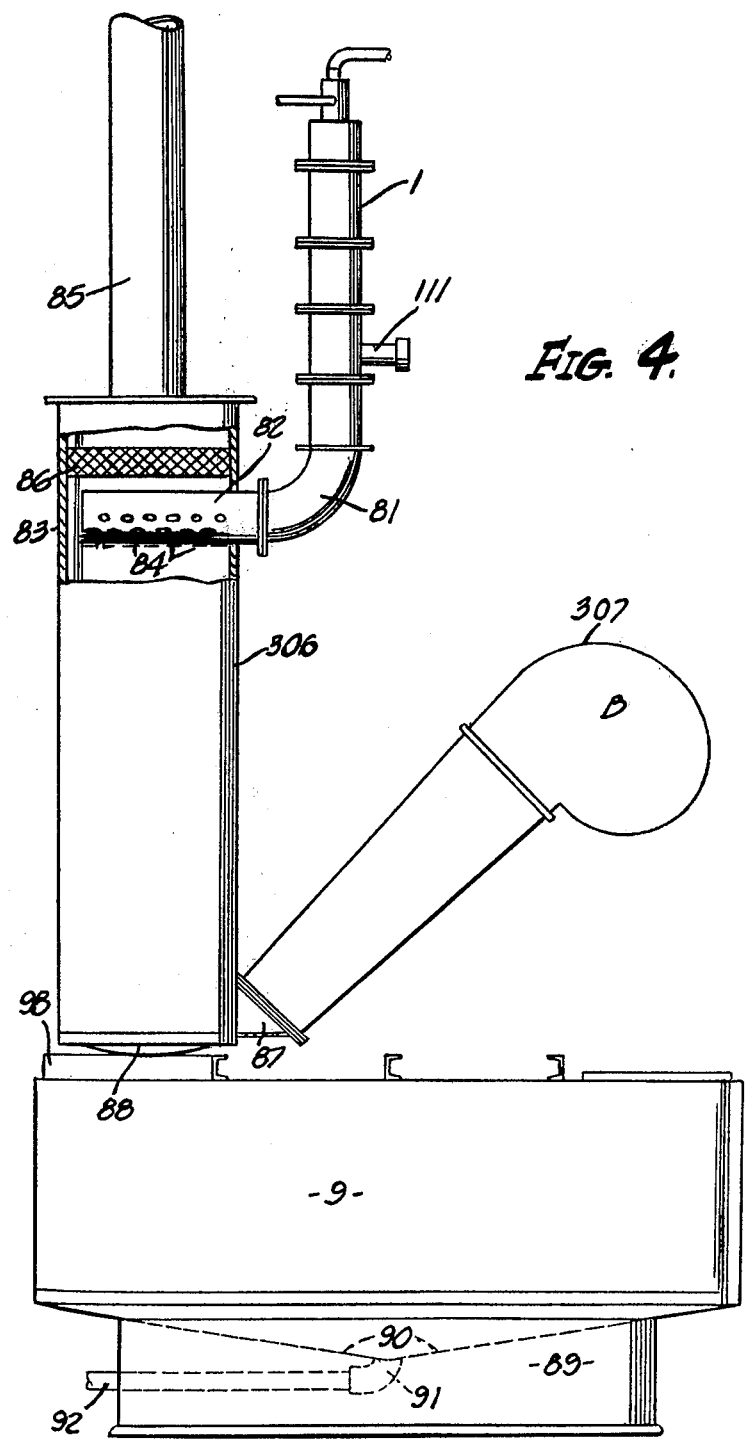
FIG. 4 is one embodiment of an apparatus that can be used in carrying out the process of this invention.

FIG. 4 shows the relationship between the reaction vessel enclosed by columnar vessel means means 1, the cooling column means 306 and the receiving vessel means 9 which constitutes one of the embodiments of this invention. The reaction vessel means 1 is connected via connecting means 81 (which is one end of a columnar vessel means, the other end of which encloses the reaction vessel, as shown in FIG. 2) to a distributor means 82 which extends into the interior of the upper end of the cooling column means 6. The distributor means 82 is closed at its free end 83 and has a plurality of apertures 84 in the walls thereof communicating between the interior of the distributor means and the interior of the cooling column means. The apertures 84 can have the same characteristics as the apertures in the walls 56 of the fluid receiving means 51. When the apertures 84 are circular, they have a diameter within the range from about 1/16 inch to about 3 inches. Preferably, the diameters range from about ⅛ inch to about 2 inches as apertures of this diameter function satisfactorily in the process of this invention.

The cooling column means has a vent means 85 at its upper end to vent steam, water vapor and air. The lower end of the cooling column means has a reaction product outlet means 88 communicating with inlet means 98 to a reaction product receiving vessel means 9.

A de-entrainment means 86 is interposed between the distributor means 82 and the vent means 85 to prevent any reaction product mixture from being carried out of the vent means. An air supply means 307, such as a blower fan, for example, is connected to inlet means 87 near the bottom of column means 6. Air is supplied in this manner for counter current heat exchange and evaporative cooling with the downward flowing reaction product mixture coming from the reaction vessel means 1 and flowing into the cooling column through apertures 84 in the distributor means 82. Suitable packing material (not shown) is disposed in the cooling column between the distributor means 82 and the outlet means 88. The packng material can be made up of sections of stainless steel pipe of from about ¼ inch to about 2 inches in length and from about ¼ inch to about 3 inches in diameter, grid packing or of other suitable packing material. The packing material is retained within the column by a suitable retaining means (not shown) such as a perforated plate or grate means or the like.

The reaction product receiving vessel 9 rests on support means 89. The bottom of the reaction product receiving vessel is indicated in dotted outline 90, showing outlet means 91 communicating with outlet conduit 92.

The reaction vessel 9 rests on support means 89. The bottom of the reaction product receiving vessel is indicated in dotted outline 90, showing outlet means 91 communicating with outlet conduit 92.

The de-entrainment means 86 consists of material such as stainless steel wool, knitted polypropylene, teflon or glass. Alternatively, the de-entrainment device can consist of a tower in which gases ascend through a spiral path causing the entrained reaction product mixture liquid to separate out and return downwardly to the cooling column. Still other forms of de-entrainers are well known to those skilled in the art.

It has been found that when a liquid fertilizer product is made by the process of this invention, it is a stable liquid having a pH of from about 3.5 to about 8.5 and at the highest pH levels is non-corrosive to mild steel. Although the product contains impurities in the case where the phosphoric acid was derived from wet-process phosphoric acid, the impurities do not precipitate out on long standing at temperatures of from about 0° F. to about 120° F.

The advantages obtained by use of the process of this invention include lower initial capital outlay, lower operating costs, high polyphosphate yields, control simplicity, reduced space requirements and lower maintenance costs.

The process of this invention is illustrated by the non-limiting examples given below. In these examples, preheating of the phosphoric acid to boiling can produce concentration, or preconcentration as it is sometimes called, to higher $P_2O_5$ content. For example, wet process phosphoric acid containing impurities as set forth in the examples and having a $P_2O_5$ content of 54%, will boil at about 280° F. Therefore, a 30% $P_2O_5$ acid preheated to boiling at 280° F. is preconcentrated to 54% $P_2O_5$. In like manner, a wet process acid heated to boiling at 400° F. is preconcentrated to about 63% $P_2O_5$ under a pressure of about 25 psi and to about 50% $P_2O_5$ under pressure of about 100 psi. At 500° F. the preconcentration under similar pressures ranges from about 66.5% $P_2O_5$ to about 53% $P_2O_5$. At 575° F. the preconcentration would be from about 67% to about 54% $P_2O_5$ under pressures of from about 25 Psi to about 100 psi. The amount of preconcentration for any temperature and pressure is readily determined and ascertained by those skilled in the art. Such preconcentration, when desired, is an added benefit of the process of this invention. However, it is preferred to pressurize the feed acid sufficiently to prevent boiling at the temperature to which the acid is heated, prior to introduction into the reaction vessel, in order to prevent deposition of scale impurities. In the absence of boiling, there is no concentration or preconcentration. Concentration occurs in the reaction vessel where boiling takes place at lower pressures and/or high temperatures. In the examples, the phosphoric acid added to the reaction vessel includes the water content corresponding to the concentration stated prior to preheating.

EXAMPLE I

To a reaction vessel of the kind shown in FIG. 3 is added wet process phosphoric acid solution with an analyses showing in percent by weight 52.55% $P_2O_5$, 0.94% $Fe_2O_3$, 2.25% $Al_2O_3$, 0.45% MgO, 4.56% $SO^{--}_4$, 2.54% water insoluble solid, and the balance being substantially water. The phosphoric acid is added at the rate of about 767 parts by weight per hour at a temperature of 250° F. Water at 90° F. is added through inlet 215 at a rate of about 50 parts by weight per hour. Anhydrous ammonia at a temperature of 100° F. is added at a rate of about 125 parts by weight per hour. The temperature and pressure in the reaction vessel are maintained at about 450° F. and 20 psi. respectively. The retention time in the reaction vessel is about 20 seconds. The fertilizer product is discharged from the vessel at a temperature of about 490° F. Analyses show that the product contains, in percent by weight 48% $P_2O_5$, 12% N (Nitrogen) and 0.91% solids. The amount of $P_2O_5$ converted from the phosphate form to the polyphosphate form (conversion) is 36.5%. The melt product has a pH of 6.65 and a $N/P_2O_5$ ratio of 0.286 and is classified as an ammonium polyphosphate solid when cooled.

EXAMPLE II

The procedure of Example I is followed with the modification that water is added through inlet means 217 at a rate of about 500 parts by weight per hour, phosphoric acid is added at a rate of 635 parts by weight per hour, and anhydrous ammonia at a temperature of 100° F. is added at a rate of about 125 parts by weight per hour. The temperature and pressure in the reaction vessel are maintained at 450° F. and 20 psi respectively. The retention time in the reaction vessel is about 20 seconds. The liquid fertilizer produced is discharged from the vessel at a temperature of about 165° F. and cooled to 100° F. Analyses shows the product contains, in percent by weight, 32.04% $P_2O_5$, 12% N(nitrogen) and 0.91% solids. The amount of $P_2O_5$ converted from the orthophosphate form to the polyphosphate form (conversion) is 37.55%. The liquid fertilizer produced has a pH of 5.70, a specific gravity (Sp.Gr.) of 1.393 and a $N/P_2O_5$ ratio of 0.304 and is classified as a 10-34-0 liquid fertilizer.

EXAMPLE III

The procedure of Example II is repeated with the water being added through inlet means 215 at start up and after two minutes is all added through inlet means 217 near the product discharge port where it serves to quench the molten product mixture. A product of the kind described in Example II is obtained.

EXAMPLE IV

To a reaction vessel of the kind shown in FIG. 3 is added wet process phosphoric acid solution with an analyses showing in percent by weight 54% $P_2O_5$, 1.1% $Fe_2O_3$, 1.9% $Al_2O_3$, 3.1% $SO_3$ and 0.1% water insoluble solids. The phosphoric acid under a pressure of 150 psi is added at the rate of 920 parts by weight per hour at a temperature of 500° F. without preconcentration. Water at 99° F. is added through inlet 217 at a rate of about 1100 parts by weight per hour. Anhydrous ammonia at a temperature of 250° F. is added at a rate of about 200 parts by weight per hour. The temperature and pressure in the reaction vessel are maintained at about 640° F. and 100 psi respectively. The retention time in the reaction vessel is about 7 minutes. The liquid fertilizer product is discharged from the vessel at a temperature of about 250° F. Analyses show that the product contained, in percent by weight, 24.5 $P_2O_5$, 8.4% N and 0.2% solids. The amount of $P_2O_5$ converted from the phosphate form to the polyphosphate form (conversion) is 65% The liquid fertilizer product has a pH of 7.5, a specific gravity of 1.300 and a $N/P_2O_5$ ratio of 0.344 and is classified as a 8-24-0 liquid fertilizer.

The procedure of Example IV is repeated with a retention time of 15 minutes. A good 8-24-0 liquid fertilizer product is obtained.

The procedure of Example IV is repeated with the modification that the phosphoric acid contains 30% $P_2O_5$ and is heated to 450° F. under a pressure of 75 psi and is added to the reaction vessel at the rate of 920 parts by weight per hour. Water is admitted to the reaction vessel at the rate of 650 parts by weight per hour and ammonia at the rate of 125 parts by weight per hour. The temperature and pressure in the reaction vessel are maintained at 600° F. and 10 psi respectively. A good product is obtained.

The procedure of Example IV is repeated with the modification that the phosphoric acid is preconcentrated at 500° F. and a pressure of 50 psi prior to admission to the reaction vessel which was maintained at a pressure of 60 psi. A good product is obtained but some scale deposition is noted in the apparatus.

The processes of Examples I through IV are also followed with the variation that the amounts of ammonia and water employed are controlled by the pH meter-controller and specific gravity controller as shown in FIG. 1 and as described elsewhere in this specification. Equally good results are obtained.

EXAMPLE V

To a reaction vessel of the kind shown in FIG. 3 is added wet process phosphoric acid solution with an analyses showing in percent by weight 54.4% $P_2O_5$, 1.6% $Fe_2O_3$, 1.1% $Al_2O_3$, 2.2% $SO_3$ and 0.7% water insoluble solids. The phosphoric acid, at a temperature of 300° F. and 100 psi pressure is added without preconcentration at the rate of about 800 parts by weight per hour. Water at 95° F. is added through inlet 217 at the rate of about 600 parts by weight per hour. Anhydrous ammonia at a temperature of 200° F. is added at a rate of about 280 parts by weight per hour. The temperature and pressure in the reaction vessel are maintained at about 450° F. and 25 psi respectively. The retention time in the reaction vessel is about 8 minutes. The liquid fertilizer product is discharged from the vessel at a temperature of about 150° F. Analyses show that the product contains, in percent by weight, 33.38% $P_2O_5$, 10.17% N and 0.1% solids. The amount of $P_2O_5$ converted from the phosphate form to the polyphosphate form (conversion) is 32%. The liquid fertilizer product has a pH of 5.95, a specific gravity of 1.398 and a $N/P_2O_5$ ratio of 0.305 and is classified as a liquid fertilizer.

The procedure of Example V is repeated with a reaction temperature of 300° F., a retention time of 3 minutes and a reaction vessel pressure of 20 psi. A product of the kind described in Example V is obtained.

The procedure of Example V is repeated with the modification that the phosphoric acid is preheated to a temperature of 450° F. and the water input is increased to 660 parts by weight per hour. The reaction vessel temperature is maintained at about 600° F. The conversion to polyphosphate is about 75%.

EXAMPLE VI

To a reaction vessel of the kind shown in FIG. 3 is added wet process phosphoric acid solution with an analyses showing in percent by weight 60.4% $P_2O_5$, 2.2% $Fe_2O_3$, 3.8% $Al_2O_3$, 5.5% $SO_3$ and 2.8% water insoluble solids. The phosphoric acid under a pressure of 100 psi is added without boiling at the rate of about 1100 parts by weight per hour at a temperature of about 575° F. Water at 85° F. is added through inlet 217 at a rate of about 550 parts by weight per hour. Anhydrous ammonia at a temperature of 50° F. is added at a rate of about 254 parts by weight per hour. The temperature and pressure in the reaction vessel are maintained at about 575° F. and 40 psi respectively. The retention time in the reaction vessel is about 1 second. The liquid fertilizer product is discharged from the vessel at a temperature of about 100° F. Analyses show that the product contains in percent by weight, 32.65% $P_2O_5$, 10.17% N and 0.13% solids. The amount of $P_2O_5$ converted from the phosphate form to the polyphosphate form (conversion) is 75%. The liquid fertilizer product has a pH of 6.2, a specific gravity of 1.393 and a $N/P_2O_5$ ratio of 0.314 and is classified as a 10-34-0 liquid fertilizer.

EXAMPLE VII

To a reaction vessel of the kind shown in FIG. 3 is added wet process phosphoric acid solution with an analyses showing in percent by weight 68% $P_2O_5$, 2.1% $Fe_2O_3$, 2.3% $Al_2O_3$, 2.7% $SO_3$ and 5.2% water insoluble solids. The phosphoric acid, at a temperature of 70° F. is added at a rate of about 2,000 parts by weight per hour. Water at 70° F. is added through inlet 217 at a rate of about 1,000 parts by weight per hour. Anhydrous ammonia at a temperature of −27° F. is added at a rate of about 505 parts by weight per hour. The temperature and pressure in the reaction vessel are maintained at about 650° F. and 10 psi respectively. The retention time in the reaction vessel is about 0.1 second. The liquid fertilizer product is discharged from the vessel at a temperature of about 225° F. Analyses show that the product contains, in percent by weight, 32.74% $P_2O_5$, 9.42% N and 1.00% solids. The amount of $P_2O_5$ converted from the phosphate form to the polyphosphate form (conversion) is 85%. The liquid fertilizer product has a pH of 5.6, a specific gravity of 1.387 and a $N/P_2O_5$ ratio of 0.290 and is classified as a 10-34-0 liquid fertilizer.

The procedure of Example VII is repeated with the phosphoric acid being added at a temperature of 150° F. The process is carried out at a reaction temperature of 700° F. and a reaction pressure of 0.1 psi. A product of the kind described in Example VII is obtained.

EXAMPLE VIII

To a reaction vessel of the kind shown in FIGS. 1, 2 and 4 were added superphosphoric acid having a $P_2O_5$ content of 72 wt. %, at the rate of about 88 parts by weight per hour, anhydrous ammonia, 21 parts by weight per hour, and water, 110 parts by weight per hour. The pressure drop across the reaction vessel was about 40 psi. The reaction product mixture was discharged from the reaction vessel after a retention time of about 0.1 second, at a temperature of about 230° F., into a cooling vessel comprised of a cooling column where it was cooled by a counter current air stream flowing at the rate of about 100 scfm per ton of reaction product mixture throughput per hour. The air and steam were vented as described above. The reaction product mixture was cooled to about 110° F. at which temperature it was discharged into a receiving vessel. To the receiving vessel were added 2.5 parts by weight of anhydrous ammonia and 11 parts by weight of water, per hour. The amounts of ammonia and water used with the phosphoric acid was controlled by the pH meter-controller and the specific gravity indicator controller, respectively, as described above. The 10-34-0 product formed had a pH of 6.8, a specific gravity of 1.40 and 57.1% of the $P_2O_5$ was in poly form. The product was further cooled to about 100° F. and conducted from the receiving vessel to storage.

Good results are also obtained when the procedure of Example VIII is followed with the modification that the counter current cooling air stream flows at a rate of about 50 scfm per ton of reaction product throughput per hour.

The procedure of Example VIII is followed with the modification that additional water is used to make an 8-24-0 product having a specific gravity of 1.28. The product is discharged from the reaction vessel at 225° F. and then cooled to 120° F.

EXAMPLE IX

The procedure of Example VIII is followed with modifications in which the retention time is permitted to vary from 0.1 seconds to 8 minutes. A good 10-34-0 product is obtained at such retention times.

EXAMPLE X

The procedure of Example VIII is followed with the modification that the reaction product is cooled by the addition of the 11 parts by weight of water through inlet 111 to the reaction vessel 1 shown in FIG. 2. The reaction mixture is discharged from the reaction vessel 1 into the receiving vessel 9, without using the cooling vessel 6. The 2.5 parts by weight of anhydrous ammonia are added to the receiving vessel per hour and a product of the kind described in Example VIII is obtained.

EXAMPLE XI

To a reaction vessel of the kind used in Example VIII were added superphosphoric acid having a $P_2O_5$ content of 73.1 wt. % at the rate of about 30.9 parts by weight per hour; anhydrous ammonia, 7.5 parts by weight per hour; and water, 35 parts by weight per hour. The pressure drop across the reaction vessel was about 28 psi. The reaction product mixture was discharged from the reaction vessel after a retention time of about 1 second, at a temperature of about 244° F., into a cooling vessel comprised of a cooling column where it was cooled by a counter current air stream flowing at the rate of about 200 scfm per ton of reaction product mixture throughput per hour. The air and steam were vented as described above. The reaction product mixture was cooled to about 115° F. at which temperature it was discharged into a receiving vessel. To the receiving vessel were added 0.6 parts by weight of anhydrous ammonia and 1.25 parts by weight of water, per hour. The 11-37-0 product formed had a pH of 6.4, a specific gravity of 1.435 and 58.5% of the $P_2O_5$ was in poly form. The product was further cooled to about 108° F. by indirect heat exchange with liquid ammonia and conducted from the receiving vessel to storage.

Good results are also obtained when the procedure of Example XI is followed with the modification that the counter current cooling air stream flows at a rate of about 300 scfm per ton of reaction product mixture throughput per hour.

EXAMPLE XII

Following the procedure of Example VIII, to the reaction vessel are added, in parts by weight, 88 parts of superphosphoric acid having a $P_2O_5$ content of 72.6 wt. %, 8.7 parts of anhydrous ammonia and 43 parts of water. The pressure drop across the reaction vessel is about 25 psi. The reaction product mixture is discharged from the reaction vessel after a retention time of about 10 seconds and a temperature of about 225° F. into a cooling vessel equipped with cooling means. The product mixture is cooled in the cooling vessel to a temperature of about 103° F. The product has a pH of 6.4, a specific gravity of 1.439 and 54% of the $P_2O_5$ is in poly form. Analyses of the product shows it contains 11% nitrogen and 37% $P_2O_5$ corresponding to a grade of 11-37-0 fertilizer.

EXAMPLE XIII

The procedure of Example VIII is followed with the modification that 70% of the total amount of ammonia required is added to the reaction vessel and the remainder is added through the sparger at the bottom of the receiving vessel. In like manner, 70% of the total amount of water required is added to the reaction vessel and the balance thereof added to the receiving vessel. A good 10-34-0 product is obtained.

The procedure of Example XIII is followed with the modification that the retention time in the reaction vessel is 30 seconds. A good product is obtained.

The procedure of this Example XIII is followed to produce 11-37-0 using the amounts given in Example XII. A good product is obtained.

EXAMPLE XIV

The procedure of Example VIII is followed with the modification that 99 wt. % of the total amount of ammonia required is added to the reaction vessel and the balance added through a sparger at the bottom of the receiving vessel; 99% of the total amount of the water required is added to the reaction vessel and the balance is added to the receiving vessel. A good 10-34-0 product is obtained.

EXAMPLE XV

To a reaction vessel of the kind described in Example VIII were added phosphoric acid having a $P_2O_5$ content of 54wt. % at the rate of 112 parts by weight per hour; anhydrous ammonia, 21 parts by weight per hour, and water, 80 parts by weight per hour. The pressure drop across the reaction vessel was about 40 psi. The reaction product mixture was discharged from the reaction vessel after a retention time of about 0.1 second, at a temperature of about 230° F., into a cooling vessel comprised of a cooling column where it was cooled by a counter current air stream flowing at the rate of about 100 scfm per ton of reaction product mixture throughput per hour. The air and steam were vented as described above. The reaction product mixture was cooled to about 110° F. at which temperature it was discharged into a receiving vessel. To the receiving vessel were added 2.5 parts by weight of anhydrous ammonia and 11 parts by weight of water per hour. The 10-34-0 product formed has a pH of 6.8, a specific gravity of 1.40 and 57.1% of the $P_2O_5$ was in poly form. The product was further cooled to about 100° F. and conducted from the receiving vessel to storage.

Good results are also obtained when the procedure of Example VIII is followed with the modification that the counter current cooling air stream flows at a rate of about 50 scfm per ton of reaction product mixture throughput per hour.

The procedure of Example VIII is followed with modifications in which the retention time is permitted to vary from 0.1 seconds to 8 minutes. A good 10-34-0 product is obtained at retention times within this range.

The procedure of Example VIII is followed with the modification that additional water is used to make an 8-24-0 product having a specific gravity of 1.28.

The procedure for Examples VIII through XIV are more fully set forth in the description relating to the process and apparatus earlier in this specification and as shown in the drawings. In each case the pH and the specific gravity are monitored and the amount of ammonia and water added to the acid is controlled to obtain the desired product.

The procedure of Example XV is followed with the modification that the phosphoric acid employed had a $P_2O_5$ content of 40 wt. %. This acid is added at the rate of 150 parts by weight per hour. Anhydrous ammonia is added at the rate of 21 parts by weight per hour, and water is added at the rate of 40 parts by weight per hour. A product similar to that of Example VIII is obtained. A good product is obtained when phosphoric acid having a $P_2O_5$ content of 53% is employed in the process of Example XV, and also when phosphoric acid having a $P_2O_5$ content of 62% is employed and water is added at the rate of 100 parts by weight per hour.

Reaction temperatures below about 225° F., as for example 150° F., are employed when the method of this invention is carried out under pressures which are sufficiently reduced to bring about boiling of the reaction product mixture at the reaction temperature. The apparatus used for reduced pressure work is well known and commercially available and will not be described here.

Additional examples of runs made using the process of this invention are contained in the following Tables I, II, III, IV, V(a) and V(b).

TABLE I

| RUN NUMBER | 1 | 2 | 3 | 4 | 5 | 6 | 7 |
|---|---|---|---|---|---|---|---|
| COMPONENTS FED TO REACTION VESSEL: | | | | | | | |
| Phosphoric Acid (P.A.) | | | | | | | |
| (a) wt. % $P_2O_5$ content | 72.3 | 73.1 | 72.6 | 72.5 | 71.8 | 71.8 | 72.7 |
| (b) percent of $P_2O_5$ in Poly Form | 56.1 | 60.7 | 56.5 | 59.0 | 59.2 | 57.5 | 59.6 |
| (c) P.A. added (parts by wt./unit time) | 4040 | 3090 | 3350 | 9890 | 8850 | 8480 | 8900 |
| Ammonia added, (Parts by wt./unit time) | 900 | 750 | 660 | 2340 | 2100 | 2100 | 1900 |
| Water added, (Parts by wt./unit time) | 485 | 3500 | 4275 | 11000 | 11000 | 12500 | 9900 |
| Pressure drop across Reaction Vessel psi. | 28 | 28 | 25 | 45 | 40 | 42 | 45 |
| Reaction Vessel Exit Temp. °F. | 245 | 244 | 225 | 230 | 225 | 230 | 230 |
| Retention time (in Reaction Vessel) | 0.1 Sec. | 0.1 Sec. | 0.1 Sec. | 0.1 Sec. | 0.1 Sec. | 0.1 Sec. | 0.1 Sec. |
| Cooling Tower Exit Temp. °F. | 110 | 115 | 108 | 105 | 110 | 98 | 95 |
| Cooling Tower air, scfm/ton reaction product mixture throughput per hour | 390 | 410 | 550 | 230 | 175 | 510 | 340 |
| COMPONENTS FED TO REACTION PRODUCT MIXTURE RECEIVING VESSEL: | | | | | | | |
| Ammonia added (parts by wt./unit time) | 150 | 60 | 210 | 250 | 200 | 100 | 150 |
| Water added (parts by wt./unit time) | 175 | 125 | 260 | 1100 | 1100 | 1750 | 600 |
| pH of End Product | 6.45 | 6.40 | 6.40 | 6.8 | 7.1 | 6.4 | 5. |
| Specific gravity of End Product | 1.440 | 1.435 | 1.439 | 1.400 | 1.402 | 1.404 | 1.470 |
| Percent $P_2O_5$ in poly form in end product | 54.2 | 58.5 | 54.0 | 57.1 | 58.3 | 54.5 | 57.3 |
| Temp. of product to storage, °F. | 105° | 108° | 103° | 100° | 74° | 92° | 98° |
| Grades of N—$P_2O_5$—$K_2O$ fertilizer produced | 11-37-0 | 11-37-0 | 11-37-0 | 10-34-0 | 10-34-0 | 10-34-0 | 12-43-0 |

TABLE II

| RUN NUMBER | 1 | 2 | 3 | 4 | 5 | 6 | 7 | 8 | 9 |
|---|---|---|---|---|---|---|---|---|---|
| COMPONENTS FED TO REACTION VESSEL: | | | | | | | | | |
| Phosphoric Acid (P.A.) | | | | | | | | | |
| (a) wt. % $P_2O_5$ content | 80 | 69 | 86 | 70 | 70 | 80 | 71 | 78 | 78 |
| (b) percent of $P_2O_5$ in Poly Form | 84 | 43 | 95 | 30 | 30 | 84 | 52 | 70 | 70 |
| (c) P.A. added (parts by wt./unit time) | 1290 | 1620 | 10,000 | 7100 | 4,810 | 11,500 | 6,692 | 10,300 | 10,300 |
| Ammonia added, (Parts by wt./unit time) | 350 | 350 | 3,500 | 1900 | 1,100 | 3,110 | 1,558 | 2,700 | 2,700 |
| Water added, (Parts by wt./unit time) | 800 | 650 | 17,530 | 5174 | 5,500 | 14,000 | 7,693 | 12,270 | 12,270 |
| Pressure drop across Reaction Vessel psi. | 1 | 2 | 100 | 45 | 10 | 80 | 20 | 60 | 60 |
| Reaction Vessel Exit Temp. °F. | 150° F. | 150° F. | 350° F. | 400° F. | 200° F. | 300° F. | 220° F. | 250° F. | 218° F. |
| Retention time (in Reaction Vessel) | 8 min. | 15 min. | 0.1 sec | 0.1 sec | 0.3 sec | 0.1 sec | 0.1 sec | 0.5 sec | 3 min. |
| Cooling Tower Exit Temp. °F. | 80° F. | 80° F. | 150° F. | 150° F. | 120° F. | 120° F. | 100° F. | 100° F. | 100° F. |
| Cooling Tower air, scfm/ton reaction product mixture throughput per hour | 4000 | 3800 | 220 | 270 | 600 | 240 | 430 | 360 | 360 |
| COMPONENTS FED TO REACTION PRODUCT MIXTURE RECEIVING VESSEL: | | | | | | | | | |
| Ammonia added (parts by wt./unit time) | 30 | 30 | 300 | 300 | 100 | 200 | 135 | 200 | 200 |
| Water added (parts by wt./unit time) | 35 | 35 | 1,200 | 1000 | 30 | 625 | 200 | 300 | 300 |
| pH of End Product | 5.90 | 5.90 | 7.00 | 7.00 | 6.20 | 6.25 | 6.20 | 6.25 | 6.25 |
| Specific gravity of End Product at 80° F. | 1.52 | 1.56 | 1.41 | 1.41 | 1.40 | 1.45 | 1.40 | 1.38 | 1.38 |
| Percent $P_2O_5$ in poly form in end product | 75 | 41 | 70 | 50 | 25 | 75 | 50 | 65 | 65 |
| Temp. of product to storage, °F. | 79 | 79 | 120 | 120 | 110 | 110 | 115 | 125 | 125 |
| Grades of N—$P_2O_5$—$K_2O$ fertilizer produced | 12-43-0 | 12-43-0 | 12-33-0 | 12-33-0 | 10-34-0 | 11-37-0 | 10-34-0 | 11-37-0 | 11-37-0 |

TABLE III

ANALYSES OF POLYPHOSPHATE LIQUID FERTILIZER REACTION PRODUCTS FROM NON HEATED ORTHOPHOSPHORIC ACID FEED

| Material | Reaction Vessel Temp. °F. | % $P_2O_5$ | % $P_2O_5$ As Polyphosphate | % N | % Solids | % $Fe_2O_3$ | % $Al_2O_3$ | % MgO | pH | Sp. Gr. | $N/P_2O_5$ |
|---|---|---|---|---|---|---|---|---|---|---|---|
| Feed Acid | — | 51.75 | — | — | 2.18 | 1.04 | 2.01 | 0.39 | — | — | — |
| Reaction Product | 500 | 27.80 | 32.80 | 7.31 | 6.98 | 0.67 | 1.06 | 0.22 | — | — | — |
| Reaction Product | 460 | 32.94 | 30.94 | 10.63 | 2.77 | — | — | — | 6.85 | 1.395 | 0.322 |
| Reaction Product | 460 | 31.55 | 26.34 | 10.63 | 5.80 | — | — | — | 7.10 | 1.373 | 0.337 |
| Reaction Product | 455 | 48.23 | 35.72 | 13.98 | 5.22 | — | — | — | 6.65 | (Molten) | 0.289 |

TABLE IV

ANALYSES OF POLYPHOSPHATE LIQUID FERTILIZER REACTION PRODUCTS FROM PREHEATED ORTHOPHOSPHORIC ACID FEED

| Material | Pre-Heat °F. | Reaction Vessel Temp. °F. | % $P_2O_5$ | % $P_2O_5$ As Polyphosphate | % N | % Solids | % $Fe_2O_3$ | % $Al_2O_3$ | % MgO | % $SO_4$ | pH | Sp. Gr. | $N/P_2O_5$ |
|---|---|---|---|---|---|---|---|---|---|---|---|---|---|
| Feed Acid | — | — | 52.55 | — | — | 2.54 | 0.94 | 2.25 | 0.45 | 4.56 | | | |
| Reaction Product 1 | — | 450 | 31.61 | 20.12 | 8.70 | 2.03 | — | — | — | — | 5.30 | 1.404 | .275 |
| Reaction Product 2 | — | 460 | 32.56 | 20.70 | 9.12 | 1.13 | — | — | — | — | 5.40 | 1.406 | .280 |
| Reaction Product 3 | — | 480 | 31.66 | 23.28 | 9.25 | 0.91 | — | — | — | — | 5.50 | 1.390 | .292 |
| Reaction Product 4 | 250 | 490 | 32.04 | 37.55 | 9.75 | 0.91 | — | — | — | — | 5.70 | 1.393 | .304 |
| Reaction Product 5 | 280 | 490 | 30.67 | 43.36 | 10.25 | 0.15 | — | — | — | — | 6.30 | 1.381 | .334 |
| Reaction Product 6 | — | 475 | 34.26 | 31.38 | 11.25 | 0.89 | — | — | — | — | 6.45 | 1.442 | .328 |
| Reaction Product 7 | — | 480 | 31.68 | 36.02 | 10.54 | 0.27 | — | — | — | — | 5.95 | 1.390 | .332 |
| Reaction Product 8 | — | 475 | 32.38 | 35.18 | 10.24 | 0.97 | — | — | — | — | 6.20 | 1.410 | .316 |
| Reaction Product 9 | — | 475 | 31.41 | 33.14 | 10.52 | 0.57 | — | — | — | — | 6.70 | 1.392 | .335 |
| Reaction Product 10 | 310 | 495 | 28.98 | 37.85 | 9.25 | 0.18 | — | — | — | — | 6.00 | 1.358 | .319 |
| Reaction Product 11 | 300 | 480 | 29.70 | 39.70 | 8.95 | 0.25 | — | — | — | — | 5.70 | 1.355 | .301 |

TABLE V-A

ANALYSES OF POLYPHOSPHATE LIQUID FERTILIZER REACTION PRODUCTS FROM PREHEATED ORTHOPHOSPHORIC ACID FEED

| | | | Components in Percent By Weight | | | | | | | | | | |
|---|---|---|---|---|---|---|---|---|---|---|---|---|---|
| Material | Pre-Heat °F. | Reaction Vessel Temp. °F. | % $P_2O_5$ | % $P_2O_5$ As Poly-Phosphate | % N | % Solids | % $Fe_2O_3$ | % $Al_2O_3$ | % MgO | % $SO_4$ | pH | Sp. Gr. | $N/P_2O_5$ |
| Feed Acid | — | — | 54.16 | — | — | 1.88 | 1.05 | 2.10 | 0.35 | 2.70 | — | — | — |
| Reaction Product 1 | 280 | 495 | 32.03 | 25.66 | 10.87 | — | — | — | — | — | — | — | .339 |
| Reaction Product 2 | 295 | 495 | 36.95 | 37.08 | 10.78 | — | — | — | — | — | — | — | .291 |
| Reaction Product 3 | 310 | 500 | 34.32 | 41.05 | 9.80 | — | — | — | — | — | — | — | .286 |
| Reaction Product 4 | 310 | 500 | 35.39 | 43.43 | 10.72 | — | — | — | — | — | — | — | .303 |
| Reaction Product 5 | 310 | 500 | 33.83 | 46.94 | 10.18 | — | — | — | — | — | — | — | .301 |
| Reaction Product 6 | 310 | 500 | 33.35 | 44.62 | 9.83 | — | — | — | — | — | — | — | .295 |
| Reaction Product 7 | 350 | 505 | 34.30 | 49.42 | 10.55 | — | — | — | — | — | — | — | .308 |
| Reaction Product 8 | 350 | 510 | 34.26 | 47.49 | 9.81 | — | — | — | — | — | — | — | .286 |
| Reaction Product 9 | 370 | 515 | 33.12 | 55.80 | 9.73 | 0.18 | — | — | — | — | — | — | .294 |
| Reaction Product 10 | 375 | 525 | 33.85 | 59.79 | 10.04 | 0.18 | — | — | — | — | — | — | .296 |
| Reaction Product 11 | 380 | 535 | 34.08 | 66.05 | 10.23 | 0.20 | — | — | — | — | — | — | .301 |
| Reaction Product 12 | 400 | 575 | 52.65 | 68.24 | 10.17 | 0.13 | — | — | — | — | — | — | .312 |

TABLE V-B

OPERATING CONDITIONS FOR PRODUCTION OF POLYPHOSPHATE LIQUID FERTILIZER FROM ORTHOPHOSPHORIC ACID

| | TEMPERATURES | | | PRESSURES | | | FLOWS, IN PART BY WEIGHT | | | |
|---|---|---|---|---|---|---|---|---|---|---|
| RUN (Nos. correspond to Nos. in Table V-A) | Feed Acid °F. | Reaction Vessel °F. | Reaction Vessel Discharge °F. | Feed Acid Pump psig | Reaction Vessel psig | Acid Parts/Min. | Ammonia Parts/Min. | Process Water Parts/Min. | Product Approx. Parts/Min. | |
| 1 | 280 | 495 | 165 | 40 | 43 | 540 | 330 | 460 | 1100 | |
| 2 | 295 | 495 | 165 | 40 | 32 | 540 | 300 | 460 | 1100 | |
| 3 | 310 | 500 | 170 | 40 | 32 | 540 | 300 | 460 | 1100 | |
| 4 | 310 | 500 | 165 | 40 | 32 | 540 | 300 | 460 | 1100 | |
| 5 | 310 | 500 | 165 | 42 | 33 | 540 | 300 | 460 | 1100 | |
| 6 | 310 | 500 | 165 | 42 | 33 | 540 | 300 | 460 | 1100 | |
| 7 | 350 | 505 | 165 | 44 | 34 | 540 | 300 | 460 | 1100 | |
| 8 | 350 | 510 | 185 | 40 | 35 | 540 | 300 | 460 | 1100 | |
| 9 | 370 | 515 | 170 | 30 | 28 | 590 | 320 | 500 | 1200 | |
| 10 | 375 | 525 | 185 | 32 | 29 | 590 | 320 | 500 | 1200 | |
| 11 | 380 | 535 | 200 | 34 | 30 | 645 | 360 | 550 | 1300 | |
| 12 | 400 | 575 | 205 | 38 | 33 | 645 | 370 | 550 | 1300 | |

In the above tables, the balance of the compositions of the feed acids and of the fertilizer products is made up substantially of water.

The in-line-mixing and reacting invention has been described hereinabove with illustrative examples and drawings of typical equipment that can be used in carrying out the process of this invention; however, such examples and illustrations are to be taken by way of example only and not by way of limitation. The invention is to be construed broadly within its spirit and scope as set forth in the following claims:

We claim:

1. Apparatus suitable for the ammoniation of phosphoric acid and the production of an aqueous ammonium phosphate solution, assembled in combination, comprising, (a) a fluid reactor means having a plurality of inlet means at one end thereof suitable for the admission of phosphoric acid, ammonia and water, said inlet means being so positioned as to provide for rapid ammoniation of the phosphoric acid with the evolution of heat, to produce a reaction product mixture containing a liquid portion and steam, said fluid reactor means having an exit means adapted for the expulsion, at the other end thereof, of the reaction products mixture therefrom by steam generated by the heat liberated in the ammoniation process, (b) columnar vessel means having an outlet means at one end thereof and enclosing at the other end thereof the said other end of said fluid reactor means, (c) a plurality of barrier means obturating said columnar vessel means in a spaced-apart relationship, said barrier means having a plurality of apertures therein for the passage of reaction products mixture therethrough, (d) inlet quench means connected to said columnar vessel means for the introduction into said columnar vessel means of a liquid aqueous quenching fluid, and (e) means, in communication with said other end of said fluid reactor means, for separating steam from the liquid portion of the reaction mixture and removing the separated steam from said apparatus.

2. Apparatus suitable for the ammoniation of phosphoric acid and the production of an aqueous ammonium phosphate solution, assembled in combination, comprising, (a) a fluid reactor means having a plurality of inlet means at one end thereof suitable for the admission of phosphoric acid, ammonia and water, said inlet means being so positioned as to provide for rapid ammoniation of the phosphoric acid with evolution of heat, to produce a fluid reaction products mixture comprising a liquid portion and steam, said fluid reactor means having an exit means adapted for the expulsion, at the other, outlet, end thereof, of the fluid reaction products mixture therefrom by steam generated by the heat liberated in the ammoniation process, (b) columnar vessel means having an outlet means at the outlet end thereof and enclosing at the other, inlet, end thereof the said other end of said fluid reactor means, (c) a plurality of barrier means obturating said columnar vessel means in a spaced-apart relationship, said barrier means having a plurality of apertures therein for the passage of the fluid reaction products mixture therethrough, (d) inlet quench means connected to said columnar vessel means for the introduction of a liquid, aqueous quenching fluid into said columnar vessel means to produce an aqueous ammonium polyphosphate, (e) means in communication with said outlet end of said columnar vessel means, for separating steam from the liquid portion of the fluid reaction mixture and removing the separated steam from said apparatus, and (f) means for further cooling the aqueous ammonium polyphosphate produced by the introduction of said liquid, aqueous quenching fluid.

3. The apparatus of claim 1 wherein means are included for receiving the reaction product and wherein said quench means comprise valve means and conduit means connected near said outlet means.

4. The apparatus of claim 2 further comprising means for adjusting the pH of the cooled aqueous ammonium polyphosphate, and means for determining the pH of said cooled aqeuous ammonium polyphosphate.

5. The apparatus of claim 2 further comprising means for adjustment of the specific gravity of the quenched aqueous ammonium polyphosphate.

6. The apparatus of claim 2 further comprising means for receiving the aqueous ammonium polyphosphate.

7. The apparatus of claim 2 wherein said means for further cooling comprises means for heat exchange with liquid ammonia.

8. The apparatus of claim 2 wherein said fluid reactor means is configured to provide for downward gravity flow of the reaction mixture.

9. The apparatus of claim 2 wherein said means for further cooling comprises air cooling means.

10. The apparatus of claim 2 further comprising packing means disposed intermediate said barrier means.

11. The apparatus of claim 2 wherein said quench means comprises valve means and conduit means connected near said outlet means.

12. The apparatus of claim 2 wherein said means for further cooling comprises counter-current air cooling vessel means having an inlet means communicating with the outlet means of said columnar vessel means, and air inlet means, a vent means and a product outlet means.

13. The apparatus of claim 2 wherein said means for further cooling the aqueous ammonium phosphate comprises cooling columnar means in communication with said outlet end of said columnar vessel means.

14. The apparatus of claim 2 wherein said means for separating steam from the liquid portion of the reaction mixture comprises distribution means in communication with said columnar vessel means, said distribution means being in communication with a cooling column means comprising vent means at the upper end thereof to vent said steam and de-entrainment means interposed between said distributor means and said vent means to prevent said liquid portion of the reaction mixture from being carried out of the vent means.

* * * * *